Nov. 25, 1969  D. D. WEBB  3,479,666

CAMOUFLAGED HELMET SHELL AND METHOD FOR MAKING SAME

Filed July 24, 1968

INVENTOR
DANIEL D. WEBB

BY Cullen, Sloman, & Cantor

ATTORNEYS

United States Patent Office 3,479,666
Patented Nov. 25, 1969

3,479,666
CAMOUFLAGED HELMET SHELL AND METHOD
FOR MAKING SAME
Daniel D. Webb, Birmingham, Mich., assignor to
American Safety Equipment, Oak Park, Mich., a
corporation of Michigan
Filed July 24, 1968, Ser. No. 747,255
Int. Cl. A42b 1/08; C04b 41/16; B29h 9/02
U.S. Cl. 2—3                    5 Claims

ABSTRACT OF THE DISCLOSURE

A military type camouflaged helmet shell formed of fibrous glass layers, resin and an outer layer of pre-printed camouflaged, two-way stretch type cloth all bonded together by the resin and providing a roughened, glare-free, camouflaged outer surface upon the shell. The shell is made upon an upright, hollow male mold form made of a stiff, self-sustaining, slightly inflatable material which is first covered by said layers and over which a downwardly opening, closely fitting female mold form is positioned, with the male form then being inflated and the resin being cured by heat to form the integral shell.

Background of invention

This invention relates to an improvement in camouflaging and reducing the glare from the outer surface of a military type helmet shell. Present military helmet shells are camouflaged in one of two ways. In one way, the shell is painted with suitable paints of various colors to provide a camouflaging pattern upon the shell.

In another way, a cover, such as out of a net type of fabric material, is applied upon the shell and held there by suitable straps or elastic bands.

Both of these ways are not satisfactory completely in that the painting system is relatively expensive, time consuming and the paint tends to wear or flake off under various adverse weather conditions. In the case of the cover, this tends to come off during active use and in addition, when not in use, must be carried along as a separate element of equipment.

Thus, the invention is concerned with applying, as an integral lamina, of a molded plastic military type helmet shell, a camouflaged fabric cloth which is inexpensive to form during the steps of molding the shell and which is permanently a part of the helmet and further functions to reduce glare or light reflection from the helmet shell.

Summary of invention

This invention contemplates forming a molded plastic helmet shell of fibrous glass laminates with a resin which is heat curable and with an outer layer of a jersey-type knitted plastic yarn fabric applied over the fibrous glass laminate, with the laminates and fabric all bonded together to form a unitary, integral shell wall, by means of the resin impregnating the yarn.

In addition, the method of forming the shell comprises using a hollow, male mold form, which is arranged upright and is made of a relatively stiff, although somewhat resilient, self-sustaining, slightly inflatable material over which the layers are positioned, and a downwardly opening female mold form which is lowered over the layers and male mold form, with the male form being inflated after the forms are assembled for applying pressure as well as completing the close fit of the mold. In this manner, the layers are placed upon the male form and are not disturbed or moved relative thereto, the movement of the mold halves being confined to the downward movement of the female mold half.

With the foregoing in mind, an object of this invention is to thereby provide an inexpensive, permanently camouflaged, glare-free military helmet shell wherein the outer layer of fabric is pre-printed with camouflaging patterns and is applied to and integrated with the shell wall during a single molding operation.

Another object of this invention is to provide a simplified molding method using a self-sustaining form of approximately the finished size and contours of the interior wall of the shell, applying the laminates to the outer surface thereof and then inflating the form slightly, after downward positioning of the female cavity form over the laminates, and curing the bonding resin to form an integral shell wall.

These and other objects and advantages of this invention will become apparent upon reading the following description, of which the attached drawings form a part.

Detailed description

Figure 6:
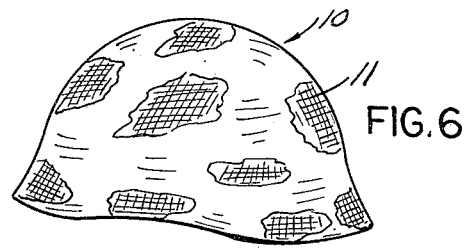
FIG. 6 is an elevational view of a helmet shell.

FIG. 6 illustrates a military type helmet shell 10 having an outer surface 11 which is roughened, glare-free and camouflaged. The contours and size of the shell are conventional but the construction and method of construction form the invention hereof.

Such a shell typically contains a suitable head suspension for mounting the helmet upon the wearer's head, all of this being omitted as being conventional.

The shell is formed upon a dome-shaped, hollow, male form 14 having an upper dome-shaped portion 15, and a lower, integral, thickened base portion 16. The form is made of a rubber-like material, such as rubber-like plastics or rubber itself.

The outer surface 17 of the dome-shaped portion 15 is approximately the same size and shape and of the same contours as the interior wall of the finished shell, but being slightly undersized.

The male form is self-sustaining in shape, that is free standing and capable of resisting the application thereon of laminates or layers, without collapsing.

The base portion 16 is secured upon a support base plate 18 with an air tight securement and is provided with an air passageway 19 to which is secured an air supply fitting 20 connected to an air supply pipe 21, through which compressed air may be pumped. A suitable compressor or source of compressed air is required, this not being illustrated as being conventional.

Located above the male form is a female mold half 24 having a downwardly opening mold cavity 25 conforming to the finished size and shape and contours of the outer surface of the helmet shell. This mold half is provided with suitable means for heating it to the required temperature and with means for raising and lowering it as necessary. In actual production, a single female mold half can be used with a number of male forms which are prepared in advance with the necessary laminates and then positioned beneath the female mold form which is lowered thereon. This constrasts with prior art molding techniques wherein the prior types of male mold forms, usually of a solid nature, have been inverted and lowered into an upwardly opening female mold form. In such prior art techniques, the movement of the laminates relative to the mold halves has created problems in production and thus, the technique of this patent application of lowering the female mold upon the male half permits operation without disturbing the laminates placed upon the male mold half and increases production and avoids molding defects and other problems.

Figure 5:
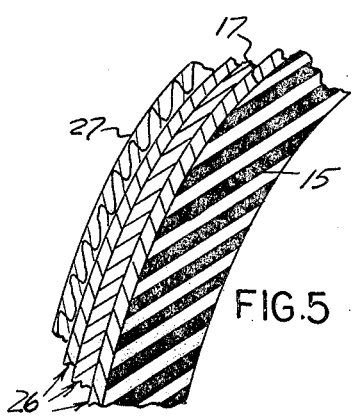
FIG. 5 is an enlarged cross-sectional view of a portion of the male form with the applied layers.

The shell is molded by applying upon the dome-shaped portion 15 of the male form, a number of layers or laminates of fibrous glass sheeting, with as many layers used as desired. FIG. 5 illustrates three such layers for illustrative purposes. The laminates or layers may be impregnated with a bonding resin, as is conventional, or alternatively, the bonding resin may be sprayed or painted upon the fibrous glass sheet after they are applied to the form.

After the fibrous glass laminates 26 are properly positioned and the resin has been applied, an outer fabric layer 27 is applied. This layer is formed of a plastic yarn cloth which is of the two-way stretch type, such as of a loose jersey-knit material. It is characterized by being elastically stretchable in two directions.

Prior to applying the cloth, the cloth is pre-printed with the required camouflaging pattern by using any of the conventional pattern applying techniques.

Figure 1:
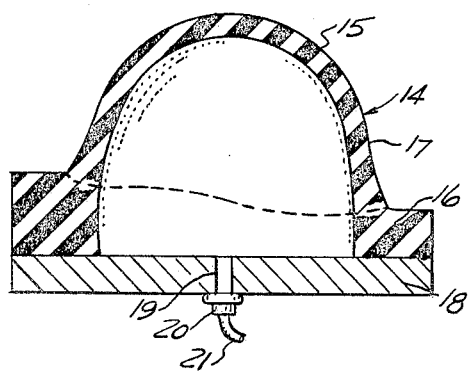
FIG. 1 is a cross-sectional elevational view of the male mold form.
Figure 2:
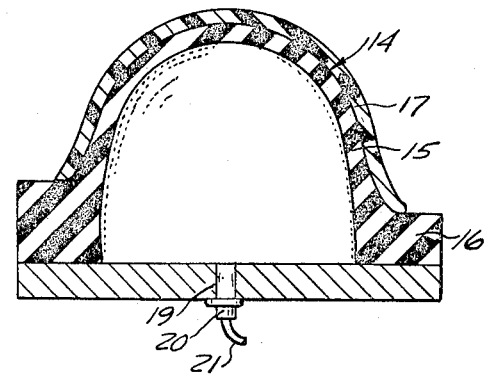
FIG. 2 is a view similar to FIG. 1, but showing the form covered with the layers, schematically illustrated, before bonding.
Figure 3:
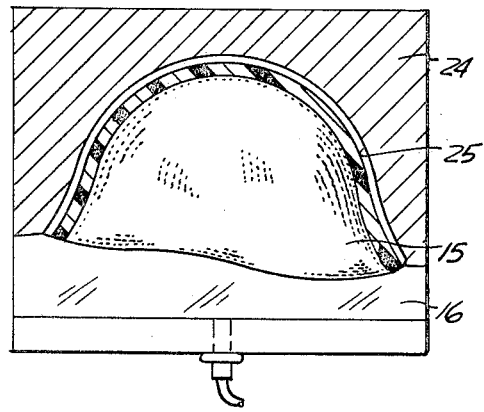
FIG. 3 illustrated the female mold, shown in cross-section, applied to the male mold, shown in elevation, with the applied layers, before inflation of the male mold.
Figure 4:
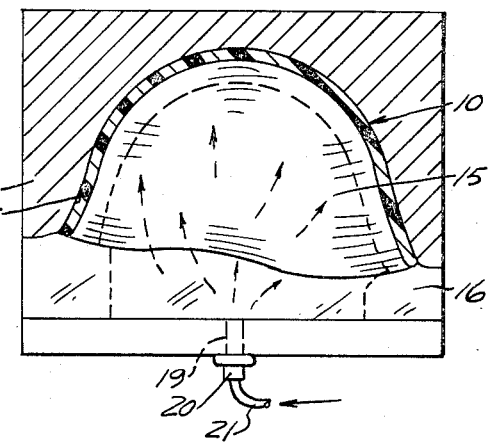
FIG. 4 is a view similar to FIG. 3, but showing the male form inflated during the bonding or curing step.

The cloth may be carefully laid over the top of the form and laminates and smoothed and spread in place so that it is substantially wrinkle free and thereafter, the female form may be lowered into position, as shown in FIG. 3, wherein there is a slight space between the fabric layer and the wall of the cavity. At that point, compressed air may be fed through the air pipe 21 and into the interior of the cavity to thereby resiliently expand the dome portion 15 to the proper size of the interior of the shell wall so that it applies an outwardly directed pressure towards the cavity wall. The amount of expansion is relatively slight, but sufficient for molding purposes.

Thereafter by the application of heat to the female mold form for the necessary time, the resin is heat cured or set and thereafter the female form is lifted, the male form is deflated and the completed shell easily lifted off the male form.

During the bonding or molding process, the resin, whether of the sprayed type or of the type impregnated upon the fibrous glass layers, will tend to plastically flow and to seep into and around the spaces of the cloth yarn to impregnate the yarn and therby rigidly bond it into position as an integral element of the finished shell wall.

The end result is a hard, rigid shell, which has an outer surface that is roughened and textured due to the weave or pattern of the cloth and in addition contains an integral, camouflaging pattern formed thereon so that it is both camouflaged and relatively glare free.

This invention may be further developed within the scope of the following claims. Accordingly, it is desired that the foregoing description be read as being merely illustrative of an operative embodiment of this invention and not in a strictly limited sense.

Having fully described an operative embodiment of this invention, I now claim:

1. A bowl-shaped military type helmet shell comprising layers of fibrous glass, heat curable resin and an outer layer of normally stretchable yarn fabric pre-printed with a camouflaging pattern, with the resin impregnating the fibrous glass and the fabric and bonding the layers together into an integral shell wall having a roughened, glare-free, camouflaged outer surface.

2. A helmet as defined in claim 1, and said fabric being of a loose, jersey-type knit material.

3. A method for molding an open bottom, bowl-shaped helmet shell, comprising:
   using a dome-shaped, hollow, closed, male mold form made of a stiff, rubber-like material which is free standing and self-sustaining in shape and capable of resisting the application thereon of laminates without collapsing, the form being slightly less in size and shape than the finished size and shape of the interior surface of the helmet shell, and a female mold form having a downwardly opening cavity of the size and shape of the finished outer contours of said shell;
   applying fibrous glass laminates and a heat curable resin to the surface of said male mold form;
   next, covering the laminates with an outer layer formed of a stretchable yarn fabric and stretching the fabric to smoothly cover said laminates;
   then lowering the female mold form upon the male mold form and inflating the male mold form slightly until it is of the contour and size of the finished interior surface of the shell and thereby applying pressure towards the cavity defining wall;
   and then applying heat to cure the resin and so that the resin impregnates the fabric and laminates and forms an integral bonded shell.

4. A method as defined in claim 3, and including pre-printing said fabric with a camouflaging pattern prior to applying it to the form.

5. A method as defined in claim 3, and wherein said fabric is formed of a jersey knit plastic yarn.

References Cited

UNITED STATES PATENTS

| | | | |
|---|---|---|---|
| 2,136,473 | 11/1938 | Sloan et al. | 2—3 |
| 2,312,227 | 2/1943 | Yant | 2—3 |
| 2,420,522 | 5/1947 | Daly | 2—3 XR |
| 2,495,640 | 1/1950 | Muskat. | |
| 2,646,380 | 7/1953 | Barlow et al. | 264—132 |
| 3,018,210 | 1/1962 | Frieder et al. | 2—3 XR |
| 3,057,018 | 10/1962 | Lawrence et al. | 264—132 |

FOREIGN PATENTS 682,324  10/1939  Germany.

JAMES R. BOLER, Primary Examiner

U.S. Cl. X.R.

156—245; 161—413; 2644—132, 257